United States Patent
Polzin

(10) Patent No.: US 6,816,769 B2
(45) Date of Patent: Nov. 9, 2004

(54) DRIVING PERFORMANCE OF A MOTOR VEHICLE ON $\mu$-SPLIT SLOPES

(75) Inventor: Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/401,067

(22) Filed: Mar. 27, 2003

(65) Prior Publication Data

US 2003/0229439 A1 Dec. 11, 2003

(30) Foreign Application Priority Data

Mar. 27, 2002 (DE) .......................................... 102 13 666
Aug. 21, 2002 (DE) .......................................... 102 38 230

(51) Int. Cl.[7] .............................. G06F 7/00; G06F 17/00
(52) U.S. Cl. .............................. 701/78; 701/80; 701/82; 701/83; 701/91; 701/71; 701/73; 701/74; 701/75
(58) Field of Search .............................. 701/78, 80, 82, 701/83, 90, 91, 94, 1, 36, 37, 71, 73, 74, 75; 180/197; 280/5.5, 5.512, 5.513, 5.515

(56) References Cited

U.S. PATENT DOCUMENTS

| 6,377,885 B2 | * | 4/2002 | Yasui et al. .................... 701/80 |
| 2002/0099489 A1 | | 7/2002 | Polzin | |
| 2003/0216851 A1 | * | 11/2003 | Trefzer et al. ................. 701/82 |

FOREIGN PATENT DOCUMENTS

JP              8-72689          3/1996

* cited by examiner

Primary Examiner—Thomas G. Black
Assistant Examiner—Olga Hernandez
(74) Attorney, Agent, or Firm—Kenyon & Kenyon

(57) ABSTRACT

A traction control system having a braking intervention in particular for motor vehicles in which a slipping wheel is braked by a braking intervention on exceeding a slippage threshold. To improve the stability and steerability of the vehicle on slopes having different adhesive friction values between the right and left sides of the vehicle ($\mu$-split), the slippage threshold of the slipping low-$\mu$ wheel is adjusted as a function of the slope, the slippage threshold of the slipping wheel being increased with an increase in slope in the case of a front-wheel drive vehicle and is decreased with an increase in slope in the case of a rear-wheel drive vehicle.

6 Claims, 1 Drawing Sheet

DRIVING PERFORMANCE OF A MOTOR VEHICLE ON $\mu$-SPLIT SLOPES

FIELD OF THE INVENTION

The present invention relates to a traction control system having a braking intervention for motor vehicles as well as a corresponding method.

BACKGROUND INFORMATION

The driving safety of a vehicle may be improved significantly by anti-spin control (a traction control system) (TCS) in critical situations, e.g., when driving onto or accelerating on a slick road surface. This system essentially has the function of relieving the driver in critical situations and ensuring the stability and steerability of the vehicle during acceleration.

On a road surface having different adhesive friction values between the right and left sides of the vehicle ($\mu$-split), the wheel which begins to slip first (the low-$\mu$ wheel) is braked by the braking intervention on exceeding a predetermined slippage threshold and, if necessary, the engine torque is reduced to improve traction. The braking torque exerted by the brake on the slipping wheel is transmitted via the differential gear to the other wheel which is not yet spinning (high-$\mu$ wheel). This locking torque may in turn result in slippage of the wheel which had not previously been spinning, resulting in a loss of stability and in particular of the lateral guidance force of the vehicle, potentially resulting in critical situations.

Especially when starting from rest and accelerating on a slope, much lower locking torques than on a planar surface may result in spinning of the wheel which still had traction, because the contact forces of the front wheels are lower than they would be on a plane (this is true of vehicles having front-wheel drive). Therefore a vehicle driving up or down a hill may enter a critical driving situation much more quickly. In the case of vehicles with rear wheel drive, however, more torque may be transmitted because of the higher contact forces on the rear wheels than in a plane. This is not being taken into account adequately at the present time.

Therefore, an object of the present invention is to improve upon a traction control system, in particular for starting from rest and accelerating on an incline.

SUMMARY OF THE INVENTION

A main idea of the present invention is to adjust the slippage threshold of the wheel slipping first (low-$\mu$ wheel) as a function of the slope when driving uphill on a road surface having different adhesive friction values between the right and left sides of the road (vehicle) ($\mu$-split). According to the present invention, the slippage threshold of the low-$\mu$ wheel on a vehicle having front-wheel drive is increased with an increase in slope. In this way, in the case of a vehicle having front-wheel drive, a locking torque is exerted on the wheel which still has traction (high-$\mu$ wheel) only at a later point in time. The driver thus has more time to respond to the situation and let up on the accelerator, for example. In addition, there may also be automatic engine torque reduction, if necessary.

In the case of a vehicle having rear-wheel drive, however, the slippage threshold is decreased with an increase in slope. In this way, more drive torque may be transmitted to the high-$\mu$ wheel which still has traction at an earlier point in time, and the acceleration desired by the driver may be implemented if the drive torque is transmissible to the road surface.

The slope information required by the TCS system to alter the slippage thresholds may be obtained, for example, from a suitable sensor, e.g., an inclination sensor or an acceleration sensor. The road surface slope may optionally also be estimated on the basis of brake pressure values.

The new slippage threshold to be set and/or the change in slippage may be determined, for example, on the basis of characteristic curves or tables stored in the traction control system.

The slippage thresholds may be changed according to the following equation, for example:

front-wheel drive vehicles: $\text{lambda} := \text{lambda}_0 + \text{lambda}_{\text{offset}}$;

rear-wheel drive vehicles: $\text{lambda} := \text{lambda}_0 - \text{lambda}_{\text{offset}}$.

$\text{lambda}_0$ here is a slippage threshold in the plane and $\text{lambda}_{\text{offset}}$ is a slope-dependent factor by which the initial value is increased or reduced. The $\text{lambda}_{\text{offset}}$ factor is a function of the slope.

As can be seen from the mathematical relationship given above, the slippage threshold in a front-wheel drive vehicle is increased by adding the $\text{lambda}_{\text{offset}}$ factor, and in a rear-wheel drive vehicle it is reduced by subtracting this factor.

In another embodiment according to the present invention, the pressure buildup gradient with which the brake pressure on the regulated low-$\mu$ wheel increases is also altered as a function of the slope. The pressure buildup gradient here is preferably reduced with an increase in slope in front-wheel drive vehicles and increased with an increase in slope in rear-wheel drive vehicles.

In the case of a front-wheel drive vehicle, the spin tendency of the high-$\mu$ wheel is significantly reduced by the slower pressure buildup, so the vehicle remains stable.

In the case of a rear-wheel drive vehicle, however, more torque is transmitted to the high-$\mu$ wheel due to the faster buildup of pressure in order to accelerate the vehicle in accordance with the driver's intent.

The buildup of brake pressure is usually accomplished by a pulse signal having pulses of a predefined length and predetermined pulse pause. The change in the pressure buildup gradient therefore takes place through a change in pulse length and/or pulse pause. In the case of continuous systems, the change in the pressure buildup gradient is accomplished by appropriate opening of a valve.

Pulse period P and/or pressure buildup gradient P_degree may be altered according to the following procedure when there is an increase in slope, for example:

1. pulse/pause-controlled systems:
front-wheel drive vehicles:
$P = P_0 - P_{\text{offset}}$
rear-wheel drive vehicles
$P = P_0 + P_{\text{offset}}$
2. for continuously operating systems:
front-wheel drive vehicles:
$P\_\text{degree} = P\_\text{degree} - P\_\text{degree}_{\text{offset}}$
rear-wheel drive vehicles:
$P\_\text{degree} = P\_\text{degree}_0 + P\_\text{degree}_{\text{offset}}$ As this shows, pulse period P is reduced or increased in pulse/pause-controlled systems, and in continuously operating systems pressure buildup gradient P_degree is reduced and/or increased directly. Change factors $P_{\text{offset}}$ and $P\_\text{degree}_{\text{offset}}$ are each a function of slope.

According to one embodiment of the present invention, the slippage threshold or the pressure buildup gradient is changed as a function of slope on the basis of characteristic curves and/or tables or by calculation. The change may take place essentially continuously or according to predetermined slope thresholds. In the latter case, the slope threshold is switched to a new value, e.g., when a predetermined slope is exceeded, and is switched back to the initial value for the plane when it falls below the predetermined slope.

The slippage threshold is preferably increased to values above 15 km/h, in particular above 20 km/h with a 10% slope in the case of a front-wheel drive vehicle. In the case of a rear-wheel drive vehicle, the slippage threshold of the low-$\mu$ wheel is reduced, e.g., to values below 10 km/h, and preferably to values below 5 km/h.

The slippage threshold of the low-$\mu$ wheel is preferably altered independently of that of the high-$\mu$ wheel.

DETAILED DESCRIPTION

Figure 1:
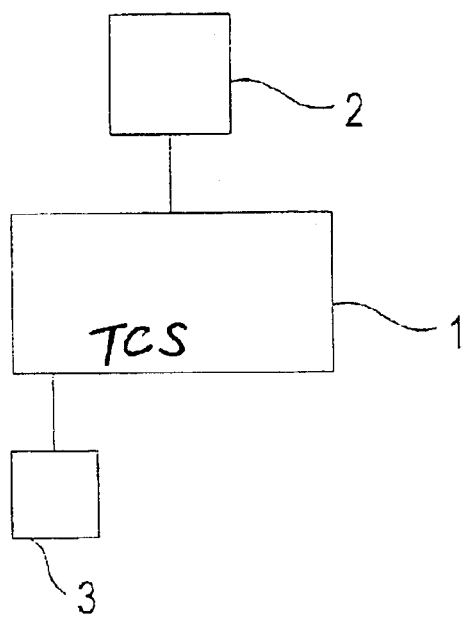
FIG. 1 shows a schematic diagram of a TCS system.

FIG. 1 shows a TCS system having a central TCS unit 1, which cooperates with a wheel brake 2 and brakes a driving wheel which has begun to slip when a predetermined slippage threshold is exceeded and it reduces the engine torque if necessary. TCS unit 1 is also connected to sensor(s) 3 for detecting the slope of the road surface.

When driving uphill on a road surface having different adhesive friction values, the slippage threshold is adjusted as a function of the slope of the road surface. The slippage threshold of the low-$\mu$ wheel is increased with an increase in slope in the case of a vehicle having front-wheel drive and is decreased with an increase in slope in the case of a rear-wheel drive vehicle. The new slippage threshold to be set is determined on the basis of characteristic curves or tables, in particular, stored in TCS unit 1, for example.

Figure 2:
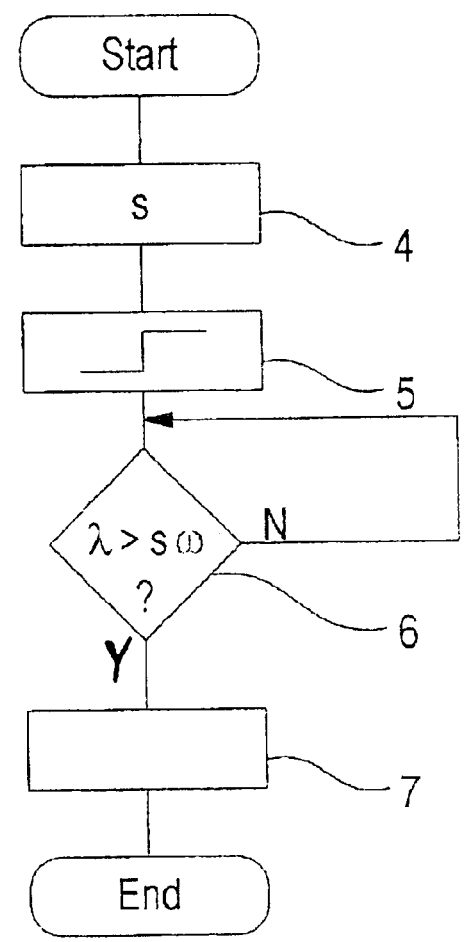
FIG. 2 shows a flow chart illustrating the method steps in adjusting the slippage thresholds to the slope of the road surface.

FIG. 2 illustrates the method steps in adjusting the slippage thresholds to the instantaneous slope of the road surface in the form of a flow chart. First in step 4, the slope of the road surface is determined, and then in step 5 the slippage threshold of the low-$\mu$ wheel is set as a function of the slope. The slippage threshold of the low-$\mu$ wheel may be set at a new value, e.g., when a slope threshold is exceeded, and reset at the initial value when the slope falls below the threshold again.

If it is found in step 6 that the wheel slip of a driven wheel exceeds a predefined slippage threshold sw, then the wheel is stabilized at the new slippage threshold thus set by wheel brake 2 in step 7.

What is claimed is:

1. A traction control system for a motor vehicle, comprising:

an arrangement for braking a slipping wheel of the vehicle by a braking intervention upon exceeding a slippage threshold, the arrangement setting the slippage threshold of a low-$\mu$ wheel as a function of a slope when driving uphill on a road surface having different adhesive friction values between right and left sides of the vehicle;

wherein the slippage threshold is increased with an increase in slope in the case of a front-wheel drive vehicle and is decreased with an increase in slope in the case of a rear-wheel drive vehicle.

2. The traction control system according to claim 1, wherein the slippage threshold is increased to a first value above 15 km/h in the case of a front-wheel drive vehicle, and is decreased to a second value below 10 km/h in the case of a rear-wheel drive vehicle.

3. The traction control system according to claim 2, wherein the first value is above 20 km/h and the second value is below 5 km/h.

4. A traction control system for a motor vehicle, comprising:

an arrangement for braking a slipping wheel of the vehicle by a braking intervention upon exceeding a slippage threshold, the arrangement setting the slippage threshold of a low-$\mu$ wheel as a function of a slope when driving uphill on a road surface having different adhesive friction values between right and left sides of the vehicle;

wherein the slippage threshold of the slipping wheel is switched to a new value when a slope threshold is exceeded, and is switched back to an initial value when the slope falls below the slope threshold.

5. A traction control system for a motor vehicle, comprising:

an arrangement for braking a slipping wheel of the vehicle by a braking intervention upon exceeding a slippage threshold, the arrangement setting the slippage threshold of a low-$\mu$ wheel as a function of a slope when driving uphill on a road surface having different adhesive friction values between right and left sides of the vehicle;

wherein a pressure buildup gradient of a brake pressure for the low-$\mu$ wheel is adjusted as a function of the slope; and wherein the pressure buildup gradient on the low-$\mu$ wheel is reduced with an increase in slope in the case of front-wheel drive vehicles and is increased with an increase in slope in the case of rear-wheel drive vehicles.

6. A method of traction control for a motor vehicle, the method comprising:

braking a slipping wheel by a braking intervention upon exceeding a slippage threshold; and setting the slippage threshold of a low-$\mu$ wheel as a function of a slope when driving uphill on a road surface having different adhesive friction values between right and left sides of the vehicle;

wherein the slippage threshold of the low-$\mu$ wheel is increased with an increase in slope in the case of a front-wheel drive vehicle and is decreased with an increase in slope in the case of a rear-wheel drive vehicle.

* * * * *